US008055818B2

(12) United States Patent
Craddock et al.

(10) Patent No.: US 8,055,818 B2
(45) Date of Patent: Nov. 8, 2011

(54) LOW LATENCY QUEUE PAIRS FOR I/O ADAPTERS

(75) Inventors: David F. Craddock, New Paltz, NY (US); Thomas A. Gregg, Highland, NY (US); Kevin J. Reilly, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/985,460

(22) Filed: Nov. 10, 2004

(65) Prior Publication Data

US 2006/0047867 A1    Mar. 2, 2006

(51) Int. Cl.
*G06F 3/00* (2006.01)
(52) U.S. Cl. .......................................... 710/54; 710/52
(58) Field of Classification Search .................. 710/54, 710/52, 57; 711/147
See application file for complete search history.

(56) References Cited

U.S. PATENT DOCUMENTS

| | | | | |
|---|---|---|---|---|
| 6,185,633 | B1 * | 2/2001 | Johnson | 710/22 |
| 6,611,883 | B1 * | 8/2003 | Avery | 710/22 |
| 6,697,878 | B1 * | 2/2004 | Imai | 719/316 |
| 6,789,143 | B2 * | 9/2004 | Craddock et al. | 710/54 |
| 6,822,960 | B1 * | 11/2004 | Manchester et al. | 370/394 |
| 7,149,817 | B2 * | 12/2006 | Pettey | 709/250 |
| 7,190,667 | B2 * | 3/2007 | Susnow et al. | 370/229 |
| 7,508,837 | B2 * | 3/2009 | Elzur | 370/413 |
| 2002/0099879 | A1 | 7/2002 | Bayer et al. | 710/22 |
| 2002/0152328 | A1 | 10/2002 | Kagan et al. | 709/250 |
| 2003/0058875 | A1 * | 3/2003 | Arndt et al. | 370/412 |
| 2003/0061379 | A1 * | 3/2003 | Craddock et al. | 709/238 |
| 2003/0061417 | A1 * | 3/2003 | Craddock et al. | 710/54 |
| 2003/0065775 | A1 | 4/2003 | Aggarwal et al. | 709/225 |
| 2003/0091055 | A1 * | 5/2003 | Craddock et al. | 370/412 |
| 2003/0195983 | A1 * | 10/2003 | Krause | 709/238 |
| 2003/0202519 | A1 * | 10/2003 | Beukema et al. | 370/400 |
| 2003/0233503 | A1 * | 12/2003 | Yang et al. | 710/100 |
| 2004/0017819 | A1 * | 1/2004 | Kagan et al. | 370/412 |
| 2004/0034718 | A1 | 2/2004 | Goldenberg et al. | 709/250 |
| 2004/0049601 | A1 | 3/2004 | Boyd et al. | 709/250 |
| 2004/0076116 | A1 * | 4/2004 | Hefty et al. | 370/230 |
| 2004/0128398 | A1 * | 7/2004 | Pettey | 709/249 |
| 2004/0151177 | A1 * | 8/2004 | Burton et al. | 370/389 |
| 2004/0202189 | A1 | 10/2004 | Arndt et al. | 370/409 |
| 2005/0018669 | A1 * | 1/2005 | Arndt et al. | 370/389 |
| 2007/0220183 | A1 * | 9/2007 | Kagan et al. | 710/36 |
| 2008/0120442 | A1 * | 5/2008 | Bayer et al. | 710/22 |

OTHER PUBLICATIONS

O'Reilly Network [online] [retrieved on Dec. 21, 2010]; retrieved from the Internet http://www.oreillynet.com/pub/a/network/2002/02/04/windows.html Odysseas Pentakalos, "An Introduction to the InfiniBand Architecture," 2002.

* cited by examiner

*Primary Examiner* — Alford Kindred
*Assistant Examiner* — Ernest Unelus
(74) *Attorney, Agent, or Firm* — Cantor Colburn LLP; Steven Chiu

(57) ABSTRACT

A low-latency queue pair (QP) is provided for I/O Adapters that eliminates the overhead associated with work queue elements (WQEs) and defines the mechanisms necessary to allow the placement of the message directly on the queue pair.

18 Claims, 7 Drawing Sheets

US 8,055,818 B2

LOW LATENCY QUEUE PAIRS FOR I/O ADAPTERS

BACKGROUND OF THE INVENTION

1. Field of the Invention

The present disclosure relates generally to computer and processor architecture, input/output (I/O) processing, operating systems and in particular, to a low-latency queue pair (QP) for I/O adapters.

2. Description of the Related Art

I/O adapters, such as remote direct memory access (RDMA)-capable adapters or RDMA network interface cards (RNICs), such as the InfiniBand™ (IB) host channel adapters (HCAs), define queue pairs (QPs) for conveying messaging information from a software consumer to the adapter prior to transmission over a network fabric. Industry standards, such as the InfiniBand™ Architecture Specification available from the InfiniBand® Trade Association and iWarp from the RDMA Consortium, specify that the message information carried on QPs is in the form of a work queue element (WQE) that carries control information pertaining to the message. Also, one or more data descriptors point to the message data to be transmitted or the location at which received messages are to be placed.

Some QP applications, such as high performance computing (HPC), have a need to reduce the latency incurred in transferring a message from one computing node to another. Even now, the industry standard mechanisms described above are no longer adequate for high performance computing systems. There is a need for a mechanism to enhance the standard QP semantics so that the lower latencies required by these applications can be achieved, with minimal impact to existing hardware.

BRIEF SUMMARY OF THE INVENTION

The present invention is directed to a system, method, and computer-readable medium for a low-latency queue pair that eliminates the overhead associated with work queue elements and defines the mechanisms necessary to allow the placement of the message directly on the queue pair.

One aspect is a system for queue pairs for input/output (I/O) adapters, including a main memory, an I/O adapter, and a processor. The main memory has a send queue and a receive queue. The I/O adapter places messages received over a link in the receive queue and transmits messages held in the send queue over the link. The processor is in communication with the main memory and the I/O adapter and executes a consumer process in the main memory. The consumer process accesses the send queue and the receive queue.

Another aspect is a method of providing queue pairs for I/O adapters. An I/O adapter places messages received over a link in a receive queue. The I/O adapter transmits messages held in a send queue over the link. The receive queue and send queue are in main memory. A consumer process accesses the send queue and the receive queue. The consumer process is executed on a processor that is in communication with the main memory and the I/O adapter.

Another aspect is a computer-readable medium storing instructions for performing a method of providing queue pairs for I/O adapters. An I/O adapter places messages received over a link in a receive queue. The I/O adapter transmits messages held in a send queue over the link. The receive queue and send queue are in main memory. A consumer process accesses the send queue and the receive queue. The consumer process is executed on a processor that is in communication with the main memory and the I/O adapter.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE INVENTION

Figure 6:
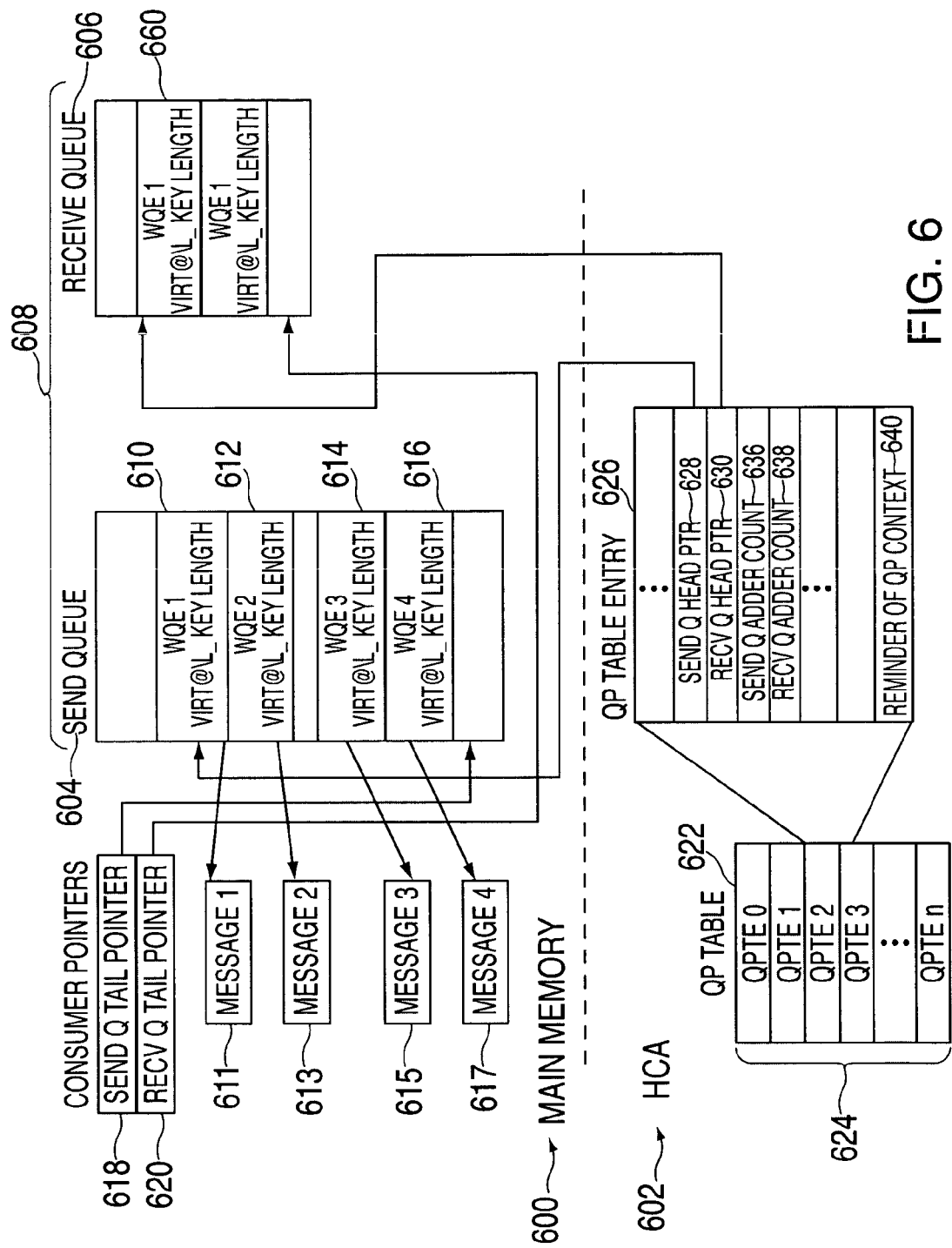
FIG. 6 is a block diagram of a standard queue pair structure in the prior art.
Figure 7:
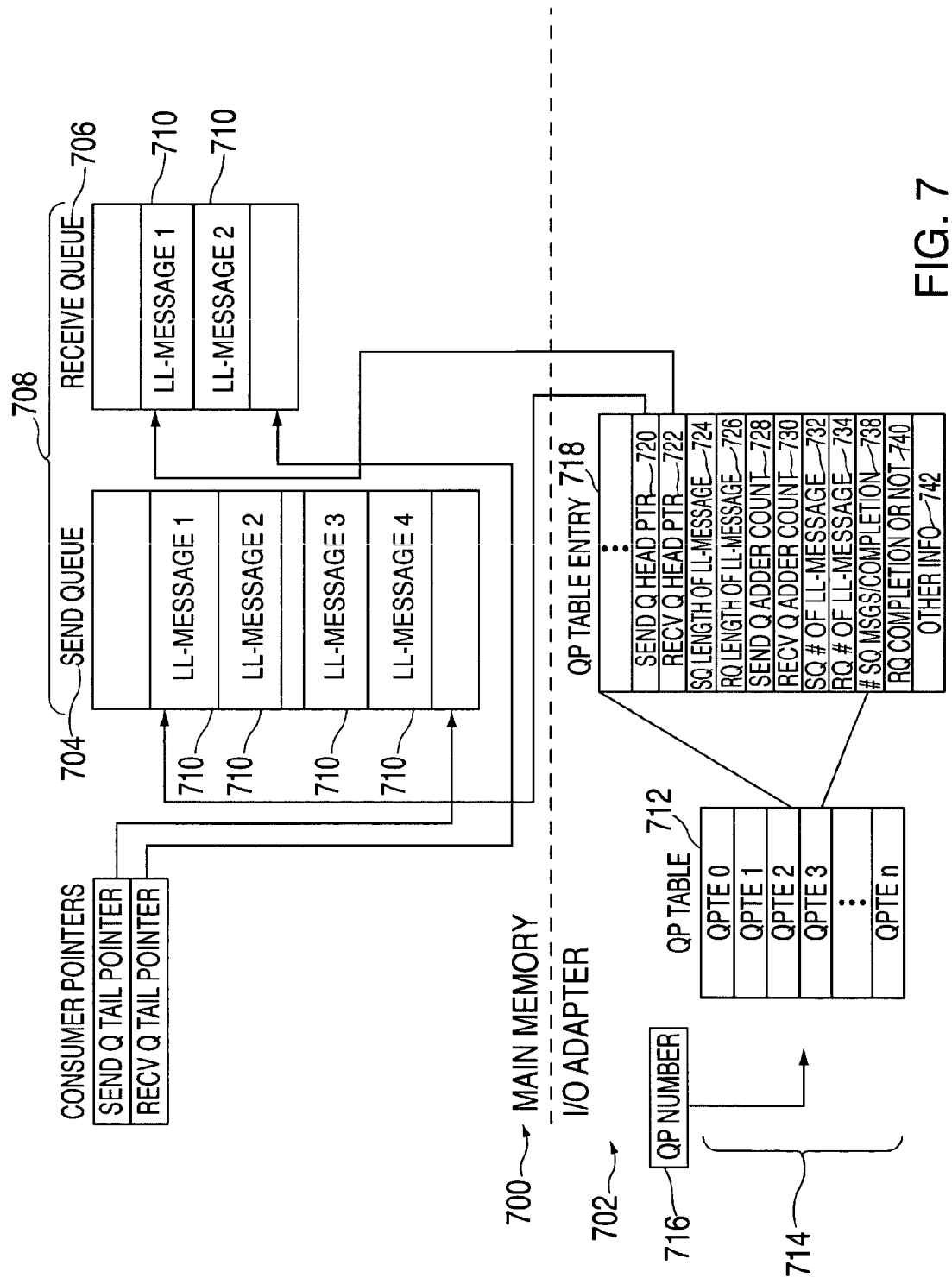
FIG. 7 is a block diagram of an exemplary embodiment of a low-latency queue pair.

Exemplary embodiments of the present invention provide a low-latency queue pair that eliminates the overhead associated with work queue elements and defines the mechanisms necessary to allow the placement of the message directly on the queue pair. Exemplary embodiments are preferably implemented in a distributed computing system, such as a prior art system area network (SAN) having end nodes, switches, routers, and links interconnecting these components. FIGS. 1-5 show various parts of an exemplary operating environment for embodiments of the present invention. FIG. 6 shows a standard queue pair structure in the prior art. FIG. 7 shows an exemplary embodiment of a low-latency queue pair.

Figure 1:
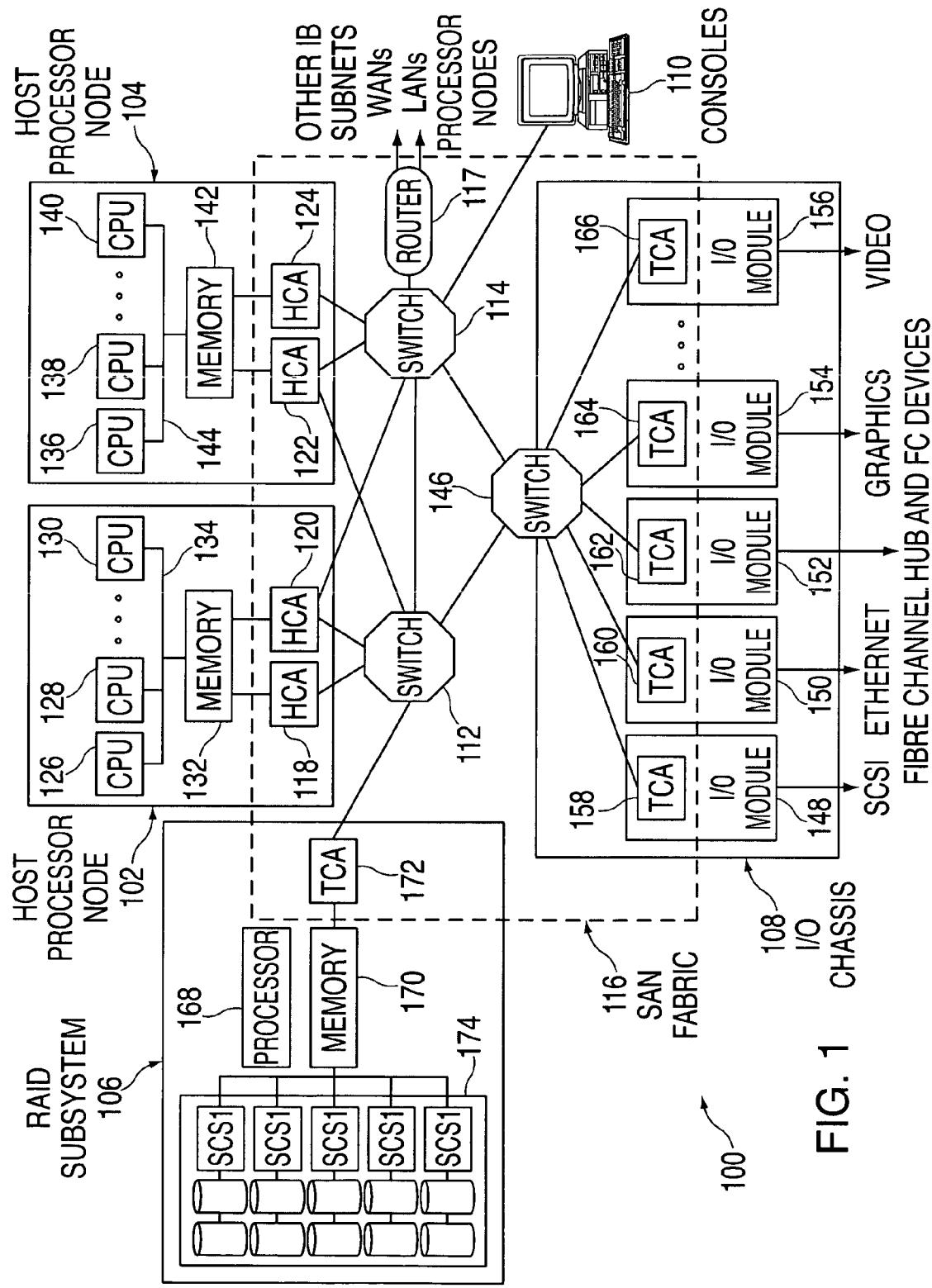
FIG. 1 is a diagram of a distributed computer system in the prior art that is an exemplary operating environment for embodiments of the present invention.

FIG. 1 is a diagram of a distributed computer system. The distributed computer system represented in FIG. 1 takes the form of a system area network (SAN) 100 and is provided merely for illustrative purposes. The exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one exemplary embodiment, an error handling mechanism in distributed computer systems is present in which the error handling mechanism allows for reliable connection or reliable datagram communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment. End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 116. Host processor node 102 contains channel adapters in the form of host channel adapter 118 and host channel adapter 120. Host processor node 104 contains host channel adapter 122 and host channel adapter 124. Host processor node 102 also includes central processing units 126-130 and a memory 132 interconnected by bus system 134. Host processor node 104 similarly includes central processing units 136-140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communication (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules take the form of adapter cards. Example adapter cards illustrated in FIG. 1 include a SCSI adapter card for I/O module 148, an adapter card to fiber channel hub and fiber channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain target channel adapters 158-166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication.

Further, SAN 100 in FIG. 1 allows I/O adapter nodes to communicate among them or communicate with any or all of the processor nodes in distributed computer systems. With an I/O adapter attached to the SAN 100 the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process.

In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
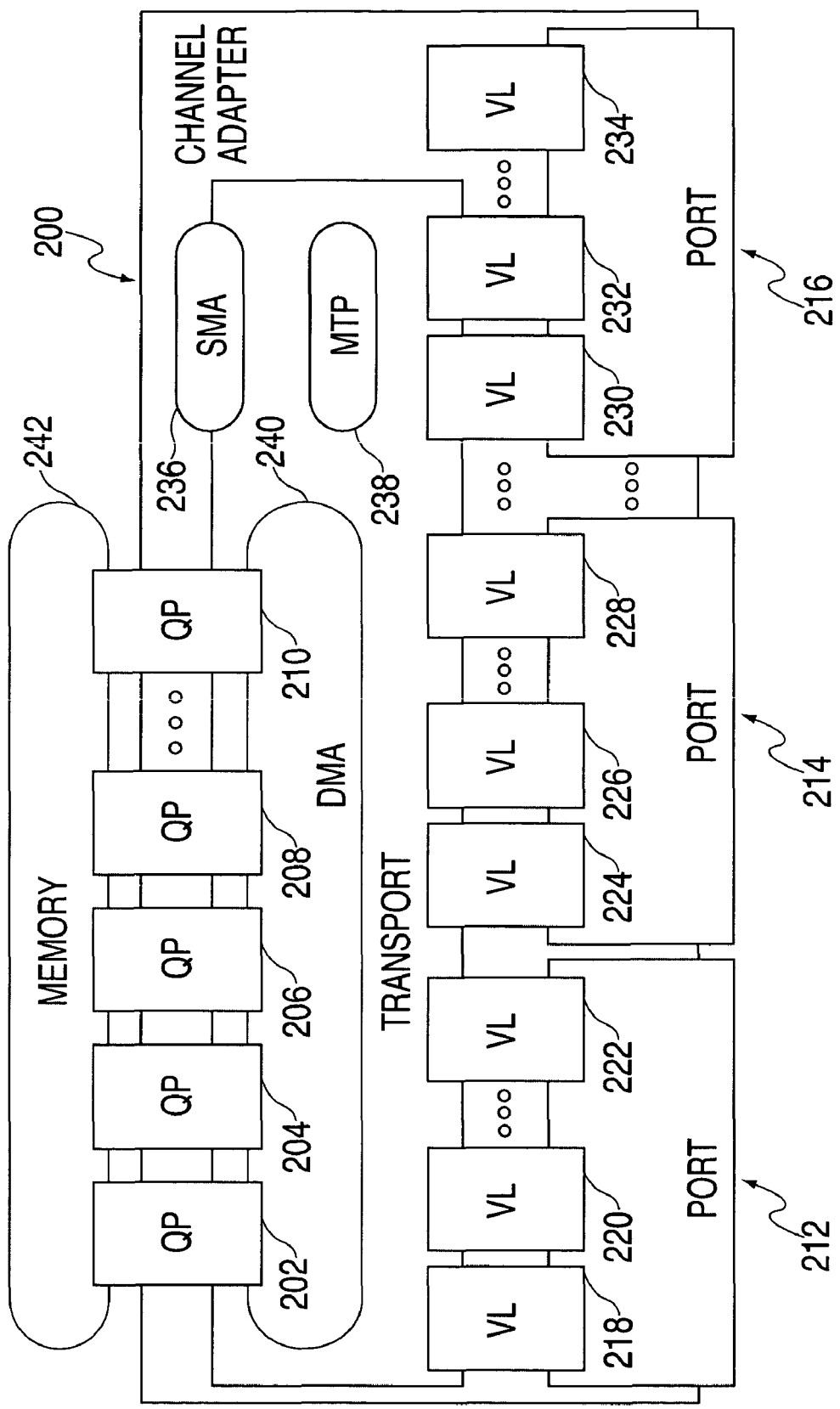
FIG. 2 is a diagram of a host channel adapter in the prior art that is part of an exemplary operating environment for embodiments of the present invention.

With reference now to FIG. 2, a diagram of a host channel adapter in the prior art is depicted. Host channel adapter 200 shown in FIG. 2 includes a set of queue pairs (QPs) 202-210, which are used to transfer messages to the host channel adapter ports 212-216. Buffering of data to host channel adapter ports 212-216 is channeled through virtual lanes (VL) 218-234 where each VL has its own flow control. Subnet manager configures the channel adapter with the local addresses for each physical port, i.e., the port's LID. Subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for direct memory access operations using memory 242 with respect to queue pairs 202-210.

A single channel adapter, such as the host channel adapter 200 shown in FIG. 2, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating system specific programming interface, which is herein referred to as verbs, to place work requests (WRs) onto a work queue.

Figure 3:
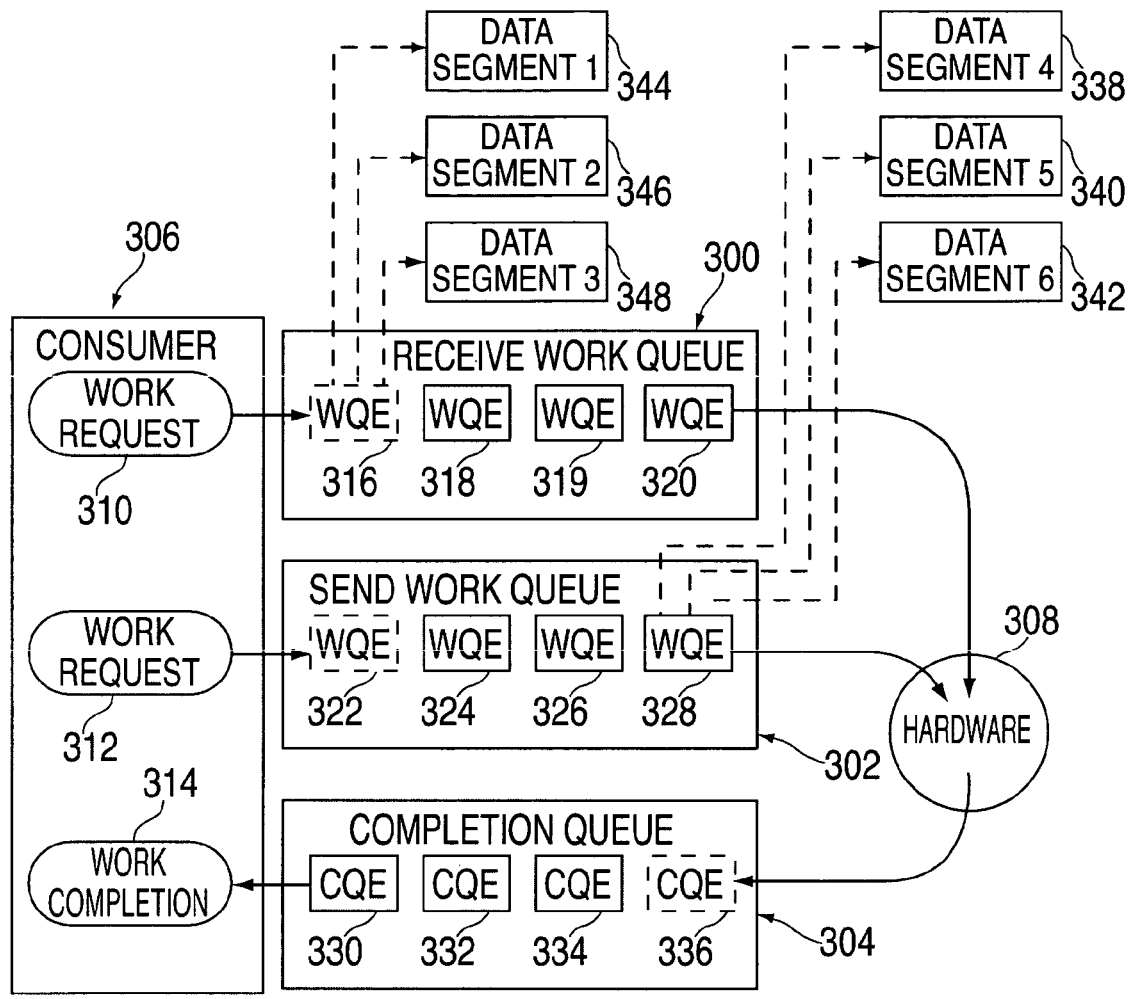
FIG. 3 is a diagram illustrating processing of work requests in the prior art that is part of an exemplary operating environment for embodiments of the present invention.

With reference now to FIG. 3, a diagram illustrating processing of work requests in the prior art is depicted. In FIG. 3, a receive work queue 300, send work queue 302, and completion queue 304 are present for processing requests from and for consumer 306. These requests from consumer 306 are eventually sent to hardware 308. In this example, consumer 306 generates work requests 310 and 312 and receives work completion 314. As shown in FIG. 3, work requests placed onto a work queue are referred to as work queue elements (WQEs).

Send work queue 302 contains work queue elements (WQEs) 322-328, describing data to be transmitted on the SAN fabric. Receive work queue 300 contains work queue elements (WQEs) 316-320, describing where to place incoming channel semantic data from the SAN fabric. A work queue element is processed by hardware 308 in the host channel adapter.

The verbs also provide a mechanism for retrieving completed work from completion queue 304. As shown in FIG. 3, completion queue 304 contains completion queue elements (CQEs) 330-336. Completion queue elements contain information about previously completed work queue elements. Completion queue 304 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 302 shown in FIG. 3 are as follows. A send work request is a channel semantic operation to push a set of local data segments to the data segments referenced by a remote node's receive work queue element. For example, work queue element 328 contains references to data segment 4 338, data segment 5 340, and data segment 6 342. Each of the send work request's data segments contains a virtually contiguous memory space. The virtual addresses used to reference the local data segments are in the address context of the process that created the local queue pair.

In one embodiment, receive work queue 300 shown in FIG. 3 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero process-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable connection, unreliable connection, reliable datagram, and unreliable datagram connection service.

Figure 4:
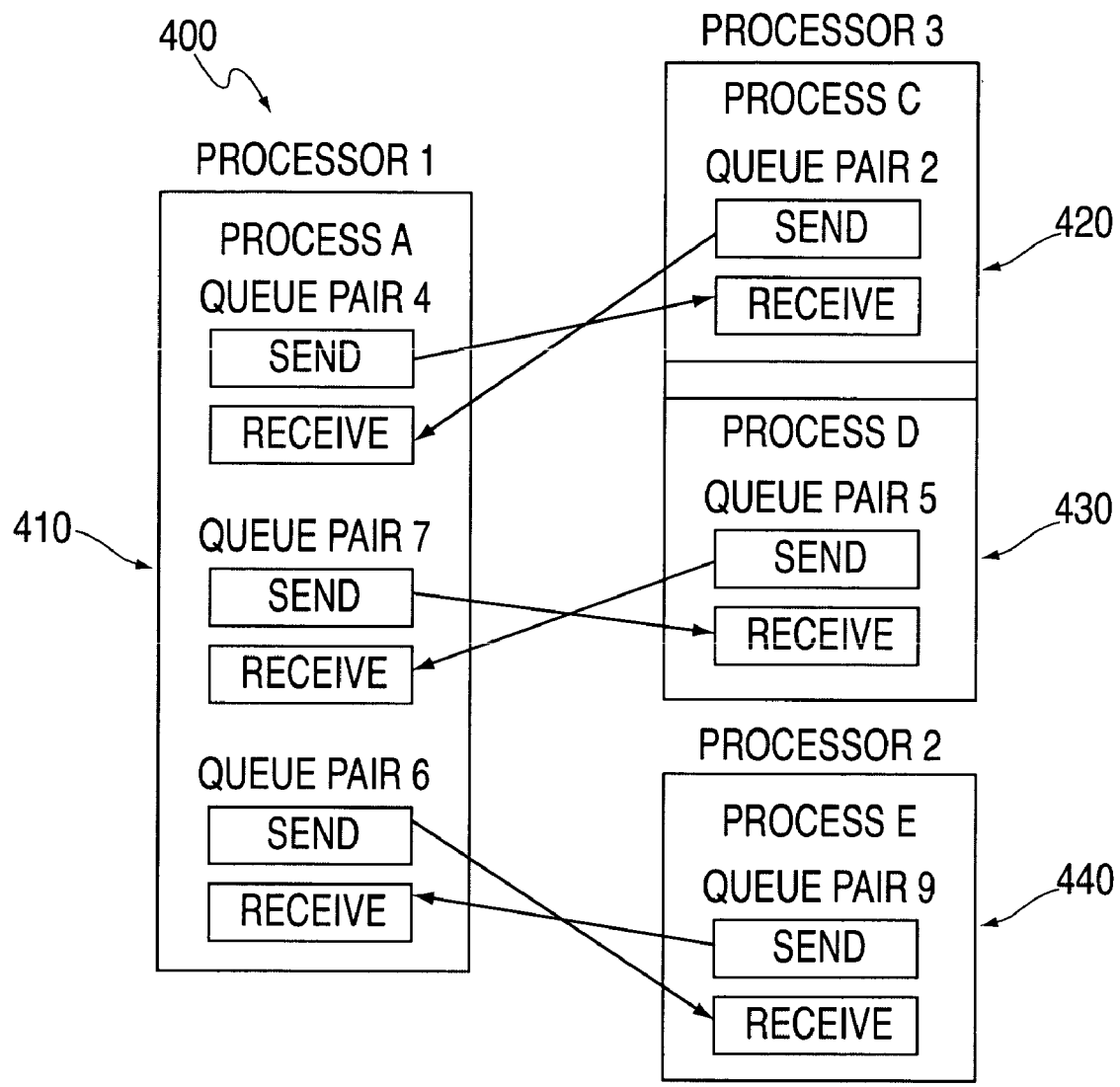
FIG. 4 is a diagram illustrating a portion of a distributed computer system in the prior art in which a reliable connection service is used that is part of an exemplary operating environment for embodiments of the present invention.

A portion of a distributed computer system employing a reliable connection service to communicate between distributed processes is illustrated generally in FIG. 4. The distributed computer system 400 in FIG. 4 includes a host processor node 1, a host processor node 2, and a host processor node 3. Host processor node 1 includes a process A 410. Host processor node 3 includes a process C 420 and a process D 430. Host processor node 2 includes a process E 440.

Host processor node 1 includes queue pairs 4, 6, and 7, each having a send work queue and receive work queue. Host processor node 2 has a queue pair 9 and host processor node 3 has queue pairs 2 and 5. The reliable connection service of distributed computer system 400 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive under runs, and network congestion. If alternative paths exist in the SAN fabric, reliable communications can be maintained even in the presence of failures of fabric switches, links, or channel adapter ports.

In addition, acknowledgements may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Figure 5:
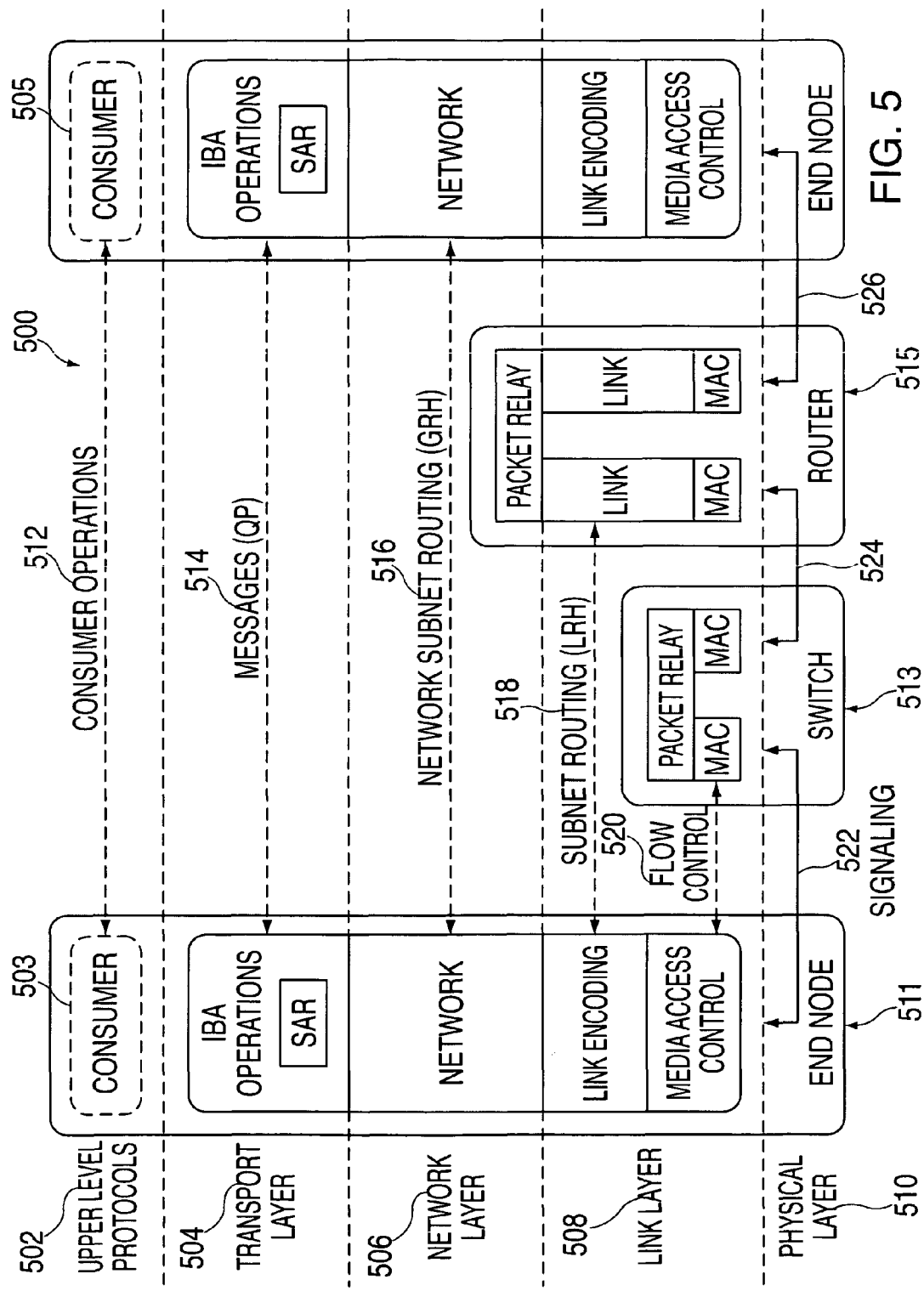
FIG. 5 is a diagram of a layered communication architecture used in the prior art that is part of an exemplary operating environment for embodiments of the present invention.

One embodiment of layered communication architecture 500 for implementing the present invention is generally illustrated in FIG. 5. The layered architecture diagram of FIG. 5 shows the various layers of data communication paths and organization of data and control information passed between layers.

Host channel adapter end node protocol layers (employed by end node 511, for instance) include upper level protocol 502 defined by consumer 503, a transport layer 504, a network layer 506, a link layer 508, and a physical layer 510. Switch layers (employed by switch 513, for instance) include link layer 508 and physical layer 510. Router layers (employed by router 515, for instance) include network layer 506, link layer 508, and physical layer 510.

Layered architecture 500 generally follows an outline of a classical communication stack. With respect to the protocol layers of end node 511, for example, upper layer protocol 502 employs verbs to create messages at transport layer 504. Network layer 506 routes packets between network subnets (516). Link layer 508 routes packets within a network subnet (518). Physical layer 510 sends bits or groups of bits to the physical layers of other devices. Each of the layers is unaware of how the upper or lower layers perform their functionality.

Consumers 503 and 505 represent applications or processes that employ the other layers for communicating between end nodes. Transport layer 504 provides end-to-end message movement. In one embodiment, the transport layer provides four types of transport services as described above which are reliable connection service; reliable datagram service; unreliable datagram service; and raw datagram service. Network layer 506 performs packet routing through a subnet or multiple subnets to destination end nodes. Link layer 508 performs flow-controlled, error checked, and prioritized packet delivery across links.

Physical layer 510 performs technology-dependent bit transmission. Bits or groups of bits are passed between physical layers via links 522, 524, and 526. Links can be implemented with printed circuit copper traces, copper cable, optical cable, or with other suitable links.

FIG. 6 shows a standard queue pair structure in the prior art. FIG. 6 is divided into two parts by a dotted horizontal line, main memory 600 above the line and a host channel adapter (HCA) 602 below the line.

Main memory 600 holds a send queue 604 and a receive queue 606, making up a queue pair 608. These queues include work queue elements (WQEs). Each WQE in the send queue describes the characteristics and location of a message that is to be transmitted over a link. For example, WQE 1 610 points to message 1 611, WQE 2 612 points to message 2 613, WQE 3 614 points to message 3 615, and WQE 4 616 points to message 4 617. Also, a consumer software process holds a send queue tail pointer 618 and a receive queue tail pointer 620.

The HCA 602 includes a QP Table 622 having a plurality of entries 624 (QPTEs a/k/a QP context). Each entry 626 includes a send queue head pointer 628, a receive queue head pointer 630, a send queue adder count 636, a receive queue adder count 638, and other information 640.

The standard queue pair shown in FIG. 6 is used in transmitting and receiving messages.

In order to transmit a message, the HCA 602 first fetches a WQE. Then, the physical address of the message in main memory is determined from the virtual address, key, and length information in the WQE through an address translation process. Next, the message in main memory 600 is fetched. Finally, one or more packets are built to transmit the message over the link.

When the HCA 602 receives a packet on the link, part of the packet header includes a QP number. The adapter places the message in the packet on the receive queue 606 of the QP 608 having that number. Then, the WQE (WQE 1 660) at the head of the receive queue 606 is fetched in order to determine where to place the message in main memory 600. The head of the receive queue is pointed to by the receive queue head pointer 630 in the entry 626 of the QP Table 622 for that QP number. The HCA 602 fetches the WQE (WQE 1 660), which contains a virtual address, a key, and a length describing the location to place the message, the HCA does a translation to determine the physical address, and then the HCA places the message there.

FIG. 7 shows an exemplary embodiment of a low-latency queue pair. Low-latency refers to the time it takes to transfer a message from one node to another node. There are certain performance-critical applications, such as high performance computing, where low-latency is needed. For example, some modeling of an I/O adapter with standard QPs took approximately twice the time to transfer a message from the memory in one node to the memory in another node compared to the time taken using exemplary embodiments of the present invention.

FIG. 7 is divided into two parts by a dotted horizontal line, main memory 700 above the line and an I/O adapter 702 below the line. Main memory 700 is associated with a processor, such as a server. Consumer software running on the processor consumes data produced by the hardware producer, I/O adapter 702. The data may be messages or any other kind of data. Examples of the I/O adapter 702 include an RDMA-capable adapter or RNIC, an HCA, or any other kind of adapter. Preferably, the I/O adapter 702 is relatively near main memory 700.

Main memory 700 holds a send queue 704 and a receive queue 706, making up a queue pair 708.

The adapter 702 includes a QP Table 712 having a plurality of entries 714 (QPTEs a/k/a QP context) indexable by QP number 716. Each entry 718 includes a send queue head pointer 720, a receive queue head pointer 722, a send queue length of message 724, a receive queue length of message 726, a send queue adder count 728, a receive queue adder count 730, a send queue number of messages 732, a receive queue number of messages 734, a number of send queue messages per completion 738, a receive queue completion or not 740, and other information 742. Preferably, the information in the queue table 712 is cached in the I/O adapter.

The exemplary low-latency queue pair shown in FIG. 7 is used, for example, in transmitting and receiving messages. In order to transmit a message 710, the consumer application simply places the message 710 directly on the send queue 704. The consumer notifies the I/O adapter 702 that one or more messages 710 have been placed on the send queue 704 by storing that number in the send queue adder count 728. The I/O adapter 702 then fetches the message referenced by the send queue head pointer 720 directly from main memory 700 and builds the packet to send over the link. When the adapter 702 receives a packet on the link, the adapter 702 simply moves the message 710 directly on the receive queue 706. As a result, the latency is lower than the standard queue pair shown in FIG. 6 and is more efficient.

One application of the exemplary low-latency queue pair is in a high performance computing environment, where there are many nodes that are connected in a cluster and performing parallel processing on very large jobs. Data and control messages flow between the nodes. The exemplary embodiment of FIG. 7 would help to increase the processing speed of such a system. Typically, a message in such a system might be 128 bytes long.

In contrast to FIG. 6, there are no WQEs used in the exemplary embodiment shown in FIG. 7. Eliminating the WQEs presented four issues that are resolved in the exemplary embodiment of FIG. 7.

First, the adapter 702 needed to be able to find a message 710 to be transmitted, without any WQE. This was resolved by placing the message 710 directly on the send queue 704.

Second, the adapter 702 needed to know the length of the message 710 received or to be transmitted. This was resolved by making length a characteristic of the QP Table Entry 718 as is depicted by SQ Length of LL message 724 and RQ Length of LL message 726. The length is a fixed size, which is advantageous for the adapter 702 hardware. Examples of message sizes include 128 bytes, 256 bytes, 512 bytes, and the like.

Third, the software consumer needed notification of completion of a successful message transmittal in order to reclaim that space on the queue. Traditionally, that kind of information was a selectable parameter in a WQE. It is desirable to generate a completion queue entry for more than one message 710 at a time, in order to reduce bandwidth and improve performance. Therefore, each QP table entry 718 includes a number of send queue messages per completion 738. The number of send queue messages per completion 738 may be any desired number, including one.

Similarly, the software consumer needed to know when a message 710 is received. This was resolved by an all-or-nothing option, which is the receive queue completion or not 740 field in the QP table entry 718. In the "all" mode, a completion is given for every message 710 received. In the "nothing" mode, a completion is never given for a received message 710. In this case, the fact that the message 710 was received is embedded in the message 710 itself in the receive queue 706. For example, a valid bit within the message 710 can be polled by the software consumer to determine when a valid message 710 is received.

Fourth, the adapter 702 needed to know when the queue pair 708 is configured as a low-latency queue pair. This was resolved by making low-latency a configuration option. For example, the software consumer can configure a queue pair as a low-latency queue pair 708 or a standard queue pair 608 (FIG. 6) when the queue pair is created.

Exemplary embodiments of the present invention have many advantages. Exemplary embodiments of the present invention provide a low-latency queue pair that eliminates the overhead associated with work queue elements and define the mechanisms necessary to allow the placement of the message directly on the queue pair. These savings can be realized on both the sending and receiving sides of the link. Simulations have shown that node-to-node latencies can be approximately halved using this invention. In addition, exemplary embodiments can interoperate with other standard nodes that do not implement those exemplary embodiments without adverse effects (but do no realize the full performance benefits when implemented on both nodes).

As described above, the embodiments of the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. Furthermore, various components may be implemented in hardware, software, or firmware or any combination thereof. Finally, many modifications may be made to adapt a particular situation or material to the teachings of the invention without departing from the essential scope thereof. Therefore, it is intended that the invention is not to be limited to the particular embodiment disclosed as the best or only mode contemplated for carrying out this invention, but that the invention will include all embodiments falling within the scope of the appended claims. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item.

What is claimed is:

1. A method comprising:

providing low-latency queue pairs for an input/output (I/O) adapter, each queue pair having an associated queue pair message context for controlling a corresponding queue pair, the queue pair message context comprising a plurality of entries in a queue pair table within the I/O adapter, with each queue pair consisting of a consumer process accessible send queue and a consumer process accessible receive queue, wherein a consumer process is executed on a processor that is in communication with a main memory and the I/O adapter, wherein the providing the low-latency queue pairs further comprises:

directly placing one or more messages received over a link in the consumer process accessible receive queue held in the main memory, according to a queue pair context, the queue pair context having entries that control the receive queue, wherein the directly placing one or more messages is performed without placing a work request in the consumer process accessible receive queue that describes a physical address of the one or more messages in main memory;

transmitting, over the link, a number of messages held in the consumer process accessible send queue, responsive to receiving notification from the consumer process that the number of messages have been placed directly in the send queue by the consumer process, the send queue being held in the main memory; and determining a queue pair dependent single message length for any messages actually present in the send queue, and determining a queue pair dependent single message length for any messages actually present in the receive queue, independent of message content.

2. The method of claim 1, wherein the queue pair context consists of a queue pair table included in the I/O adapter, the queue pair table including send queue characteristics for the send queue and receive queue characteristics for the receive queue.

3. The method of claim 2, wherein the determining step determines send queue message length and receive queue message length, respectively, from the send queue characteristics of the queue pair table included in the I/O adapter.

4. The method of claim 1, wherein the queue pair context includes a send queue adder counter for notifying the I/O adapter of the number of messages that have been placed on the send queue to be transmitted.

5. The method of claim 1, wherein the queue pair context includes a completion number, the completion number indicating how many send queue messages are sent before reporting completion to the consumer process.

6. The method of claim 1, wherein the queue pair context includes whether to notify the consumer process of reception of each message received in the receive queue.

7. A computer-readable storage medium having computer-readable instructions stored thereon for execution by a computer, for performing a method comprising:

providing low-latency queue pairs for an input/output (I/O) adapter, each queue pair having an associated queue pair message context for controlling a corresponding queue pair, the queue pair message context comprising a plurality of entries in a queue pair table within the I/O adapter, with each queue pair consisting of a consumer process accessible send queue and a consumer process accessible receive queue, wherein a consumer process is executed on a processor that is in communication with a main memory and the I/O adapter, wherein the providing the low-latency queue pairs further comprises:

directly placing one or more messages received over a link in the consumer process accessible receive queue held in the main memory, according to a queue pair context, the queue pair context having entries that control the receive queue, wherein the directly placing one or more messages is performed without placing a work request in the consumer process accessible receive queue that describes a physical address of the one or more messages in main memory;

transmitting, over the link, a number of messages held in the consumer process accessible send queue, responsive to receiving notification from the consumer process that the number of messages have been placed directly in the send queue by the consumer process, the send queue being in the main memory; and determining a queue pair dependent single message length for any messages actually present in the send queue, and determining a queue pair dependent single message length for any messages actually present in the receive queue, independent of message content.

8. A system comprising:

a main memory configured to provide a consumer process accessible send queue and a consumer process accessible receive queue;

an I/O adapter configured to perform a method of providing low-latency queue pairs for an input/output (I/O) adapter, each queue pair having an associated queue pair message context for controlling a corresponding queue pair, the queue pair message context comprising a plurality of entries in a queue pair table within the I/O adapter, with each queue pair consisting of a consumer process accessible send queue and a consumer process accessible receive queue, wherein a consumer process is executed on a processor that is in communication with a main memory and the I/O adapter, wherein the providing the low-latency queue pairs further comprises:

directly placing one or more messages received over a link in the consumer process accessible receive queue according to a queue pair context, with an associated queue pair having entries that control the send queue and the receive queue, wherein the directly placing one or more messages is performed without placing a work request in the consumer process accessible receive queue that describes a physical address of the one or more messages in main memory;

transmitting a number of messages held in the consumer process accessible send queue over the link, responsive to receiving notification from the consumer process that the number of messages have been placed directly in the send queue by the consumer process, the send queue being in main memory; and determining a queue pair dependent single message length for any messages actually present in the send queue, and determine a queue pair dependent single message length for any messages actually present in the receive queue, independent of message content; and a processor in communication with the main memory and the I/O adapter, the processor configured to execute the consumer process in the main memory.

9. The system of claim 8, wherein the queue pair context consists of a queue pair table included in the I/O adapter, the queue pair table including send queue characteristics for the send queue and receive queue characteristics for the receive queue.

10. The system of claim 9, wherein the determining step determines send queue message length and receive queue message length, respectively, from the send queue characteristics of the queue pair table included in the I/O adapter.

11. The system of claim 8, wherein the queue pair context includes a send queue adder counter for notifying the I/O adapter of the number of messages that have been placed on the send queue to be transmitted.

12. The system of claim 8, wherein the queue pair context includes a completion number, the completion number indicating how many send queue messages are sent before reporting completion to the consumer process.

13. The system of claim 8, wherein the queue pair context includes whether to notify the consumer process of reception of each message received in the receive queue.

14. The computer-readable storage medium of claim 7, wherein the queue pair context consists of a queue pair table included in the I/O adapter, the queue pair table including send queue characteristics for the send queue and receive queue characteristics for the receive queue.

15. The computer-readable storage medium of claim 14, wherein the determining step determines send queue message length and receive queue message length, respectively, from the send queue characteristics of the queue pair table included in the I/O adapter.

16. The computer-readable storage medium of claim 7, wherein the queue pair context includes a send queue adder counter for notifying the I/O adapter of the number of messages that have been placed on the send queue to be transmitted.

17. The computer-readable storage medium of claim 7, wherein the queue pair context includes a completion number, the completion number indicating how many send queue messages are sent before reporting completion to the consumer process.

18. The computer-readable storage medium of claim 7, wherein the queue pair context includes whether to notify the consumer process of reception of each message received in the receive queue.

* * * * *